US008279886B2

(12) United States Patent
Munagala et al.

(10) Patent No.: US 8,279,886 B2
(45) Date of Patent: Oct. 2, 2012

(54) DATAPORT AND METHODS THEREOF

(75) Inventors: Dinakar Munagala, Folsom, CA (US);
Hong Jiang, San Jose, CA (US);
Bishara Shomar, Nazareth (IL); Val Cook, Shingle Springs, CA (US);
Michael K. Dwyer, Folsom, CA (US);
Thomas Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 1066 days.

(21) Appl. No.: 11/024,909

(22) Filed: Dec. 30, 2004

(65) Prior Publication Data

US 2006/0146852 A1    Jul. 6, 2006

(51) Int. Cl.
*H04L 12/28* (2006.01)

(52) U.S. Cl. .............. 370/419; 370/390; 370/395.7; 370/412; 370/417

(58) Field of Classification Search .......... 370/390, 370/395.7, 398, 412, 413, 415, 417, 419; 711/108, 141, 146
See application file for complete search history.

(56) References Cited

U.S. PATENT DOCUMENTS

| | | | | |
|---|---|---|---|---|
| 3,931,613 A * | 1/1976 | Gruner et al. ............... | 711/169 |
| 4,385,206 A * | 5/1983 | Bradshaw et al. ............ | 709/244 |
| 4,485,438 A * | 11/1984 | Myrmo et al. ............... | 711/100 |
| 4,571,672 A * | 2/1986 | Hatada et al. ............... | 711/152 |
| 4,847,755 A * | 7/1989 | Morrison et al. ............ | 712/203 |
| 4,937,781 A * | 6/1990 | Lee et al. ................... | 711/149 |
| 4,951,232 A * | 8/1990 | Hannah ...................... | 345/422 |
| 4,972,314 A * | 11/1990 | Getzinger et al. ............ | 711/149 |
| 5,005,151 A * | 4/1991 | Kurkowski .................. | 710/36 |
| 5,150,328 A * | 9/1992 | Aichelmann, Jr. ........ | 365/189.03 |
| 5,265,235 A * | 11/1993 | Sindhu et al. ................ | 711/120 |
| 5,313,586 A * | 5/1994 | Rutman ...................... | 712/34 |
| 5,317,720 A * | 5/1994 | Stamm et al. ................ | 711/143 |
| 5,347,648 A * | 9/1994 | Stamm et al. ................ | 714/5 |
| 5,392,391 A * | 2/1995 | Caulk et al. ................. | 345/503 |
| 5,404,482 A * | 4/1995 | Stamm et al. ................ | 711/145 |
| 5,404,483 A * | 4/1995 | Stamm et al. ................ | 711/144 |
| 5,432,918 A * | 7/1995 | Stamm ........................ | 711/156 |
| 5,442,581 A * | 8/1995 | Poland ........................ | 708/653 |
| 5,459,846 A * | 10/1995 | Hyatt .......................... | 711/214 |
| 5,594,884 A * | 1/1997 | Matoba et al. .............. | 711/125 |
| 5,675,750 A * | 10/1997 | Matsumoto et al. ......... | 710/309 |
| 5,699,460 A * | 12/1997 | Kopet et al. ................. | 382/307 |
| 5,802,385 A * | 9/1998 | Densham et al. ............ | 712/16 |
| 5,822,553 A * | 10/1998 | Gifford et al. .............. | 710/305 |
| 5,822,603 A * | 10/1998 | Hansen et al. .............. | 712/210 |
| 5,842,031 A * | 11/1998 | Barker et al. ................ | 712/23 |
| 5,959,689 A * | 9/1999 | De Lange et al. ........... | 348/571 |
| 6,161,162 A * | 12/2000 | DeRoo et al. ............... | 710/244 |
| 6,163,828 A * | 12/2000 | Landi et al. ................. | 710/240 |
| 6,247,084 B1 * | 6/2001 | Apostol et al. .............. | 710/108 |
| 6,253,313 B1 * | 6/2001 | Morrison et al. ............ | 712/226 |
| 6,260,088 B1 * | 7/2001 | Gove et al. .................. | 710/100 |

(Continued)

*Primary Examiner* — Ayaz Sheikh
*Assistant Examiner* — Andrew C Lee
(74) *Attorney, Agent, or Firm* — Trop, Pruner & Hu, P.C.

(57) ABSTRACT

A context-free (stateless) dataport may allow multiple processors to perform read and write operations on a shared memory. The operations may include, for example, structured data operations such as image and video operations. The dataport may perform addressing computations associated with block memory operations. Therefore, the dataport may be able, for example, to relieve the processors that it serves from this duty. The dataport may be accessed using a message interface that may be implemented in a standard and generalized manner and that may therefore be easily transportable between different types of processors.

13 Claims, 6 Drawing Sheets

U.S. PATENT DOCUMENTS

| | | | |
|---|---|---|---|
| 6,359,624 B1 * | 3/2002 | Kunimatsu | 345/503 |
| 6,363,453 B1 * | 3/2002 | Esposito et al. | 711/2 |
| 6,567,426 B1 * | 5/2003 | van Hook et al. | 370/535 |
| 6,621,499 B1 * | 9/2003 | Callway | 345/629 |
| 6,622,217 B2 * | 9/2003 | Gharachorloo et al. | 711/141 |
| 6,625,654 B1 * | 9/2003 | Wolrich et al. | 709/230 |
| 6,662,253 B1 * | 12/2003 | Gary et al. | 710/244 |
| 6,751,710 B2 * | 6/2004 | Gharachorloo et al. | 711/141 |
| 6,886,086 B2 * | 4/2005 | Kobayashi et al. | 711/162 |
| 6,944,818 B2 * | 9/2005 | Newman et al. | 715/234 |
| 6,947,425 B1 * | 9/2005 | Hooper et al. | 370/394 |
| 6,976,095 B1 * | 12/2005 | Wolrich et al. | 709/250 |
| 7,082,502 B2 * | 7/2006 | Najam et al. | 711/147 |
| 7,162,615 B1 * | 1/2007 | Gelinas et al. | 712/225 |
| 7,194,535 B2 * | 3/2007 | Hannel et al. | 709/224 |
| 7,269,179 B2 * | 9/2007 | Wolrich et al. | 370/412 |
| 7,343,356 B2 * | 3/2008 | Prahlad et al. | 705/400 |
| 7,392,291 B2 * | 6/2008 | Jewett et al. | 709/214 |
| 7,437,510 B2 * | 10/2008 | Rosenbluth et al. | 711/118 |
| 7,472,299 B2 * | 12/2008 | Mukherjee | 713/323 |
| 7,500,239 B2 * | 3/2009 | Meng | 718/100 |
| 7,617,384 B1 * | 11/2009 | Coon et al. | 712/220 |
| 7,689,867 B2 * | 3/2010 | Rosenbluth et al. | 714/34 |
| 7,958,333 B2 * | 6/2011 | May | 712/205 |
| 2002/0056029 A1 * | 5/2002 | Marui | 711/147 |
| 2002/0099634 A1 * | 7/2002 | Coutts et al. | 705/35 |
| 2002/0165896 A1 * | 11/2002 | Kim | 709/102 |
| 2003/0182355 A1 * | 9/2003 | Edahiro et al. | 709/106 |
| 2004/0030745 A1 * | 2/2004 | Boucher et al. | 709/203 |
| 2004/0030861 A1 * | 2/2004 | Plackle et al. | 712/32 |
| 2004/0071152 A1 * | 4/2004 | Wolrich et al. | 370/420 |
| 2005/0066133 A1 * | 3/2005 | Rao | 711/149 |
| 2005/0097276 A1 * | 5/2005 | Lu et al. | 711/118 |
| 2005/0108487 A1 * | 5/2005 | Kobayashi et al. | 711/162 |
| 2005/0268072 A1 * | 12/2005 | Najam et al. | 712/34 |
| 2006/0010264 A1 * | 1/2006 | Rader et al. | 710/23 |
| 2006/0179231 A1 * | 8/2006 | Briggs et al. | 711/136 |
| 2007/0106923 A1 * | 5/2007 | Aitken et al. | 714/718 |
| 2007/0130401 A1 * | 6/2007 | Baker et al. | 710/62 |

* cited by examiner

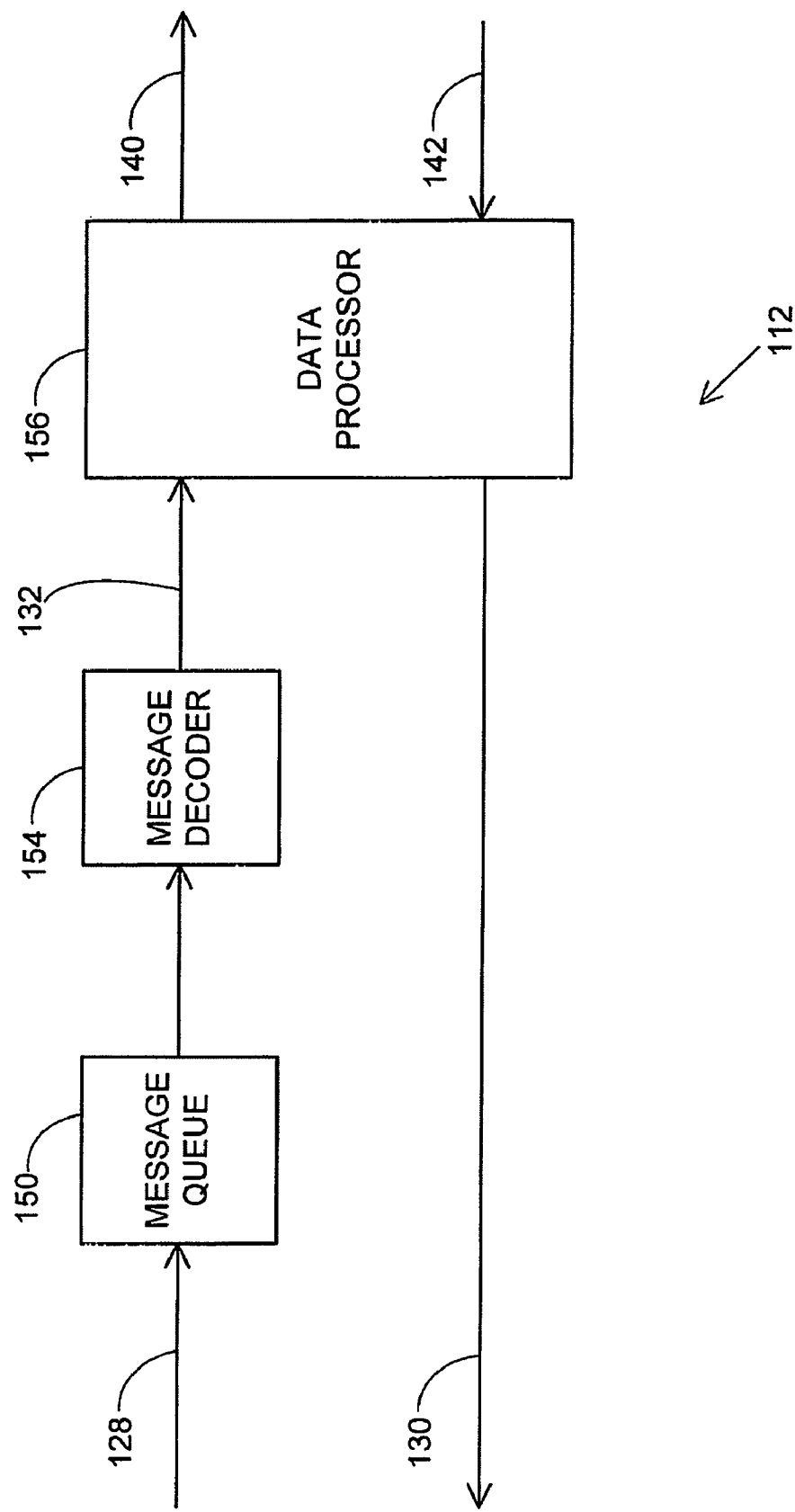

DATAPORT AND METHODS THEREOF

BACKGROUND OF THE INVENTION

The demand for increasingly sophisticated graphic-intensive games and rich multimedia applications is driving a steady growth in computing power. This trend is reflected in the popularity of multiprocessor architectures, in which an operating system manages different threads (streams of instructions) in parallel on multiple processors.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 3 is a block diagram of a dataport, in accordance with some embodiments of the present invention;

Figure 1:
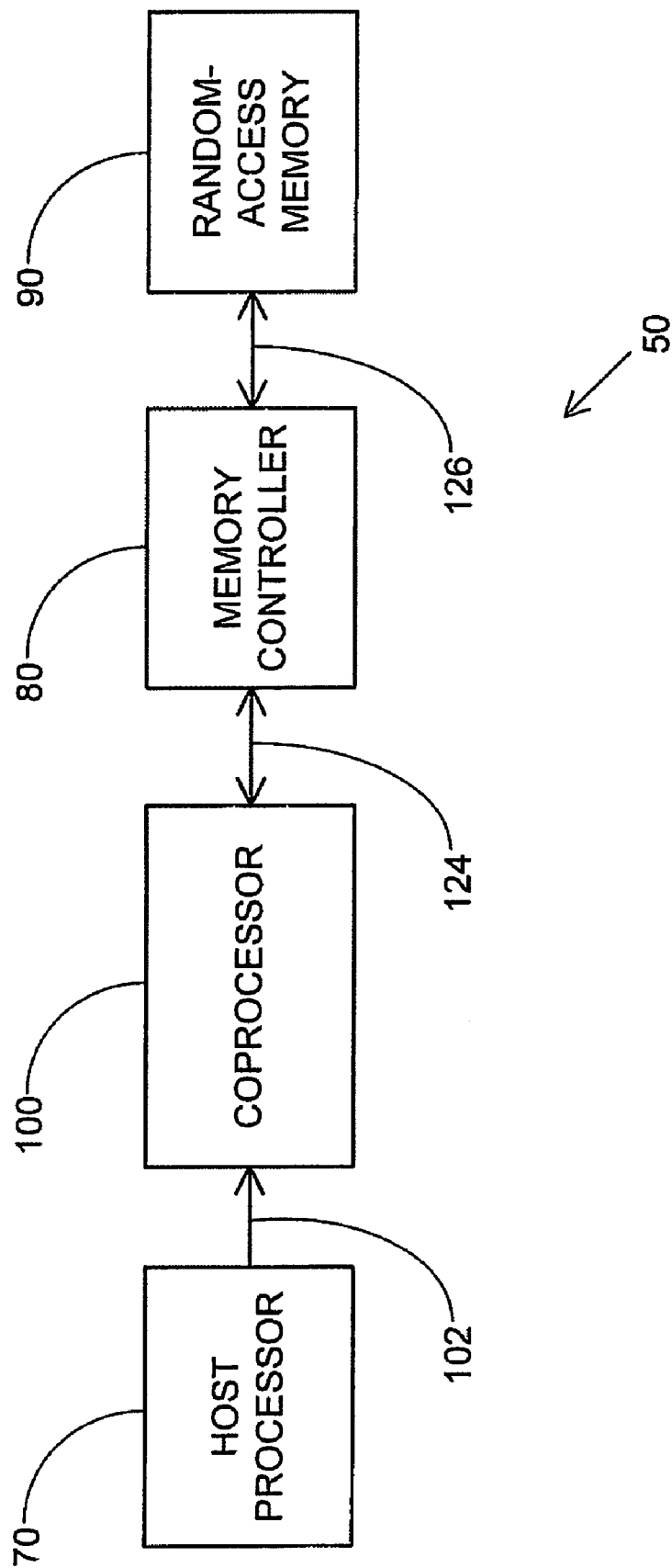
FIG. 1 is a block diagram of a system combining a host processor and a coprocessor in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Some embodiments of the present invention are directed to providing multiple processors with a standard service, hereinafter referred to as a dataport, which facilitates the execution of general and specialized data processing operations on a shared memory. These operations may include, for example, single-data-element read and write operations, 1-dimensional (linear) or multi-dimensional (e.g. rectangular) block read and write operations, multiple-block read and write operations, data scattering and gathering operations, and format conversion operations.

The dataport may also include interlaced field support for all of these operations with the specific purpose of processing image and video data. For example, a particular video format may use odd and even interlaced fields, and these may be represented by interleaving odd and even image lines in the portion of memory allocated to the frame buffer. A block read or write request to the dataport may include an interlaced field attribute. In the hereinabove example of a video format with dual-field interlacing, the dataport accesses the data corresponding to either the odd or the even image lines, depending on the state of the interlaced field attribute.

Dataport operations may be invoked using a first set of messages with a predefined format, and the results of dataport operations may be returned to the initiators of the various operations using a second set of messages with a predefined format.

The dataport may be a context-free (or stateless) resource, in that all new attributes of one or more instances of a data structure to be accessed may be included within a message describing the operation that the dataport may be requested to perform.

A non-exhaustive list of examples for data structures includes:
  geometric data
    index buffers
    vertex buffers
    lookup tables (e.g. constants)
  image data
    2D bitmaps
      progressive images
      interleaved images
      planar surfaces
    texture maps
      1D maps (e.g. constants)
      2D maps
      cube maps
      volume maps
    lookup tables
  generalized buffers
    arbitrary lookup tables The context-free nature and other characteristics mentioned hereinabove enable the dataport to be implemented in a standard, modular and generalized way that is independent of the specific type of the processors that it serves. This facilitates the reuse of a dataport design with a minimum of design and validation effort, allowing the dataport to be easily and economically transported from one multi-processor chip to another, or to be replicated multiple times within the same chip with few, if any, changes.

The hereinafter discussion should be followed while bearing in mind that the described system blocks are limited to those relevant to some embodiments of the invention, and that the described blocks may have additional functions that are irrelevant to these embodiments.

Reference is now made to FIG. 1, in which an exemplary system including a host processor and a coprocessor, in accordance with an embodiment of the invention, is illustrated.

A system 50 includes a host processor 70, a coprocessor 100, a memory controller 80, and a random-access memory (RAM) 90.

Host processor 70 may be, for example, a personal computer central processing unit (CPU), a notebook computer CPU, a personal digital assistant (PDA) CPU, a digital signal processor (DSP), a reduced instruction set computer (RISC), a complex instruction set computer (CISC), or an embedded microcontroller or microprocessor.

Coprocessor 100 may be, for example, a 2-dimensional graphics coprocessor, a 3-dimensional graphics coprocessor, a multi-media coprocessor, a math coprocessor, or a networking coprocessor.

Memory controller 80 may be, for example, a RAM controller, a direct memory access (DMA) controller, or an indirect memory controller that accesses memory via a bus such as a peripheral component interconnect (PCI) bus, an accelerated graphics port (AGP) bus, or a PCI Express bus.

RAM 90 may be, for example, a synchronous, dynamic RAM (SDRAM), a fast page mode dynamic RAM (FPM DRAM), an extended data out dynamic RAM (EDO DRAM), a burst extended data out dynamic RAM (BEDO RAM), a RAMBus dynamic RAM (RDRAM), a static RAM (SRAM), or a double data rate (DDR) memory.

Host processor 70 may issue commands to coprocessor 100 by means of a coprocessor command bus 102. Coprocessor 100 may communicate with memory controller 80 by means of a memory control bus 124. Memory controller 80 may communicate with RAM 90 by means of a memory bus 126.

For the sake of completeness it is noted that coprocessor 100 may also return data and supervisory information to host processor 70 by sending data over command bus 102 in the reverse direction, or using a separate bus. In the interests of clarity, this reverse data path is omitted from FIG. 1.

It will be appreciated by those of ordinary skill in the art that each of the blocks shown in FIG. 1 may be implemented using separate physical devices, that some or all of the blocks may share common devices, and that some blocks may be divided between a number of devices.

Figure 2:
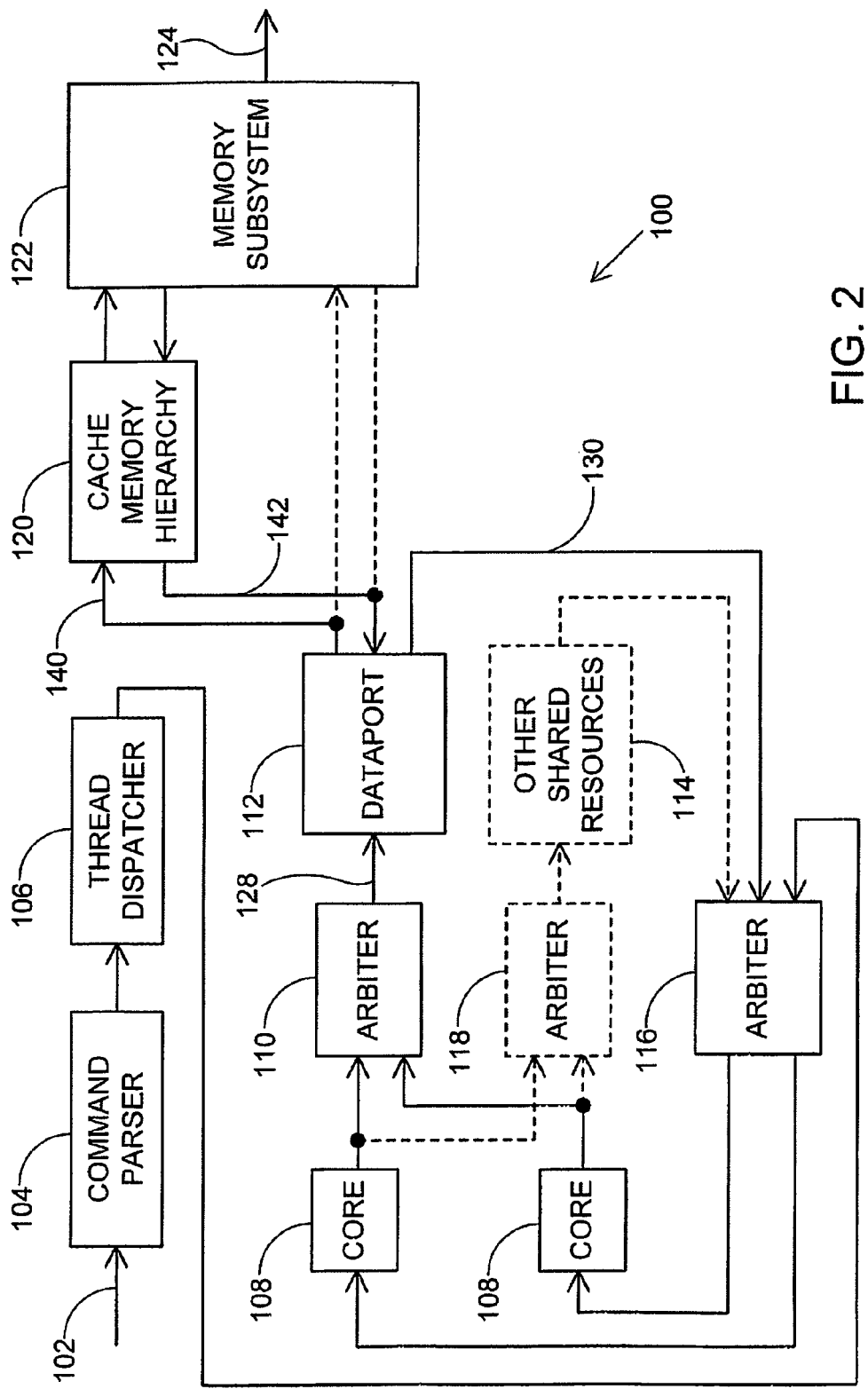
FIG. 2 is a block diagram of a coprocessor including a dataport, in accordance with some embodiments of the present invention.

Reference is now made to FIG. 2, in which an exemplary coprocessor, in accordance with an embodiment of the invention, is illustrated. This figure serves to demonstrate the location of the dataport within the environment of its application, and to show the dataport's interconnections with other system blocks.

Commands received by coprocessor 100 via command bus 102 may be interpreted by a command parser 104 and passed on to a thread dispatcher 106.

Thread dispatcher 106 may distribute, via an arbiter 116, the various tasks necessary for fulfillment of the commands by spawning corresponding threads that may be executed by one or more processor cores 108.

The threads running on processor cores 108 may request the execution of data processing operations involving the manipulation of data, and its storage in, and retrieval from, RAM 90. For example, RAM 90 may contain an image that is being used for raster display on a video screen, and a typical operation requested by a particular thread may be to fill a rectangular area of the screen with a certain color, which may be achieved by writing a corresponding value to the relevant areas of RAM 90.

A dataport 112 is a shared resource containing dedicated hardware that may be used for performing memory operations including accessing linear and rectangular blocks of data stored in RAM 90, and performing special data scattering and gathering operations that may be requested, and which are further described herein below. Processor cores 108 may thereby be relieved of these duties, and may therefore remain free to perform other computations.

Like any shared resource, such as a mathematical or network coprocessor, or an image compression and decompression engine, a dataport implementation may support a certain set of operations. The dataport's operations may be invoked using a set of predefined messages that are conveyed over an input bus 128, and the dataport may return the results of its operations to the threads that initiated them, using a set of predefined write-back messages, delivered using a write-back bus 130.

Input bus 128 is a parallel bus that may be divided into a data portion and a sideband portion. In general, data, addresses, data block descriptions, and other information of a similar nature that are associated with an operation to be executed by the dataport may be communicated using the data portion. The sideband portion may be reserved for specifying the types of the various operations, specific attributes associated with each operation, and additional routing information, such as message length, target shared function identifier, requester identifier (that is, the identity of the particular requesting processor core 108, or of the particular requesting thread running on a processor core), and message priority.

Similarly, write-back bus 130 is a parallel bus that may also be divided into a data portion and a sideband portion. Returned data and address information may generally occupy the data portion of the write-back bus, while the sideband portion may be reserved for supervisory information such as indications of the completion or failure of requested operations, and routing information, such as message length, source shared function identifier, target identifier (that is, the particular processor 108, or thread identifier, to which the write-back message is being sent), and message priority.

An important example in which dataport 112 might return a write-back message in response to a data write operation relates to the implementation of software-managed memory coherence. If a thread requests dataport 112 to perform a data write operation, it may optionally ask dataport 112 to return a write-commit write-back message, the purpose of which is to indicate that the dataport has committed the write request and that the data written to the memory hierarchy has reached the coherent memory domain. Dataport 112, in coordination with the memory hierarchy, may issue the write-commit message once all of the memory-write operations that fulfill the write request have reached the coherent domain, meaning that the newly-written data are now globally-observable by any thread.

A typical input bus 128 or write-back bus 130 might possess a data portion with a width of, say, 128 bits, 256 bits, or 512 bits. The width of the data portion may be determined in accordance with the required bandwidth and performance, and may differ from the examples given hereinabove. The width of the sideband portions of input bus 128 and write-back bus 130 may be chosen for a particular implementation depending on the scope of the control and supervisory information that needs to be conveyed. Due to the different kinds of information to be sent in the sideband portions of the input bus and the write-back bus, the widths of these portions may differ.

Messages conveyed over input bus 128 and write-back bus 130 may constitute one or more words, each of which occupies the bus width, and which are sent serially. Different message types in the same system may typically involve differing numbers of data and sideband bits, and therefore the number of words per message may not be constant. Optionally, the message length may be limited to a certain maximum number of words in order to limit the implementation cost and/or to improve the latency and impartiality of bus communications. For example, a maximum message size might be, say, eight words, allowing an exemplary input bus data portion width of 256 bits to convey a maximum of 2,048 data bits per message.

An arbiter 110 arbitrates, using some method of arbitration, between simultaneous attempts from two or more cores 108 to send a message to dataport 112.

Coprocessor 100 may optionally include other shared resources 114, such as a floating-point mathematical processor, to which access may be granted using an arbiter 118.

Alternatively, dataport 112 may share input bus 128 with other shared resources 114 and arbiters 110 and 118 may be combined to arbitrate between simultaneous requests that two or more cores 108 may issue to dataport 112 and to other shared resources 114. In the interests of clarity, this optional arrangement is omitted from FIG. 2.

Dataport 112 may access memory controller 80 (FIG. 1) through a cache memory hierarchy 120 and a memory subsystem 122. The functions of memory subsystem 122 may include tiling, cache hit/miss detection, virtual address to physical address translation, memory coherence mechanisms, and latency hiding on cache misses. Dataport 112 may communicate with cache memory hierarchy 120 by means of a write bus 140 and a read bus 142.

According to the particular implementation, cache memory hierarchy 120 may be composed of a single cache or multiple caches. For example, in the interests of system efficiency, it might be advantageous to route read-only data streams through a read-only cache and all data streams that include write operations through a separate read/write cache. Optionally, cache memory hierarchy 120 might be omitted, in which case dataport 112 may directly access memory subsystem 122.

Arbiter 116 may determine the order in which any simultaneously arriving tasks and results of operations are passed on to cores 108. It may also include a multiplexing mechanism for routing each task from thread dispatcher 106, and each of the results of operations generated by dataport 112 and other shared resources 114, to the specific core 108 for which it is intended.

Optionally, cores 108 may be permitted to bypass dataport 112 and communicate directly with cache memory hierarchy 120 or with memory subsystem 122. In the interests of clarity, this optional arrangement is omitted from FIG. 2.

If a thread is to perform an operation involving the invocation of dataport 112, and in which the thread needs to wait for data, such as a block of image data, to be returned by the dataport, the thread may coordinate its associated activities using a register file. When the thread sends the message to the dataport, the thread may also reserve in the register file a location where the returning write-back message will be stored, and may lock that location. When the write-back message is received from the dataport, it may be stored in the reserved location and the lock may be released, indicating to the thread that the requested operation has been completed, and that the resulting data are waiting in the register file.

Reference is now made to FIG. 3, in which an exemplary dataport, in accordance with an embodiment of the invention, is illustrated.

Figure 4A:
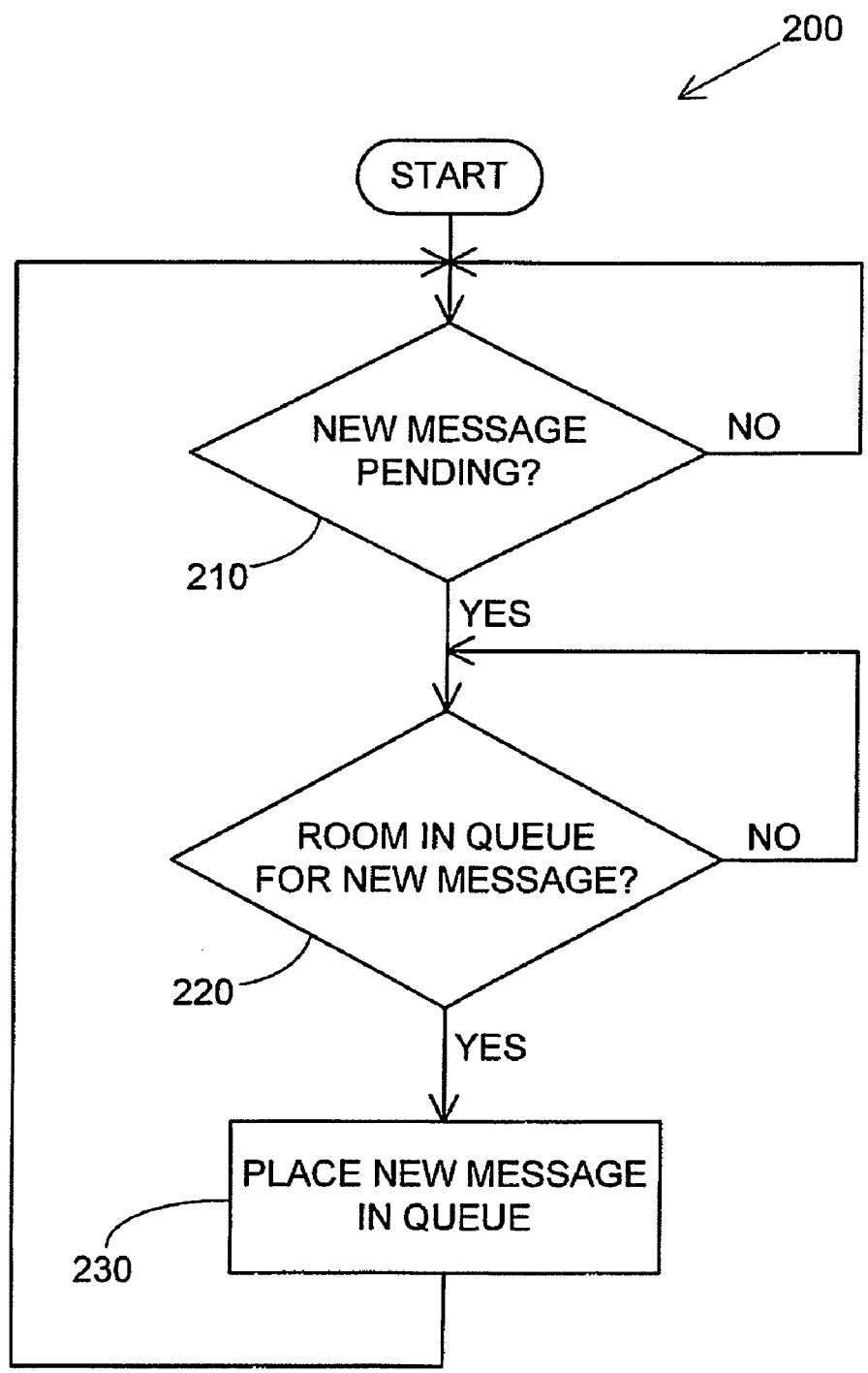
FIGS. 4A and 4B are a schematic flowchart illustration of a dataport's method of operation, using the dataport described in FIG. 3.
Figure 4B:
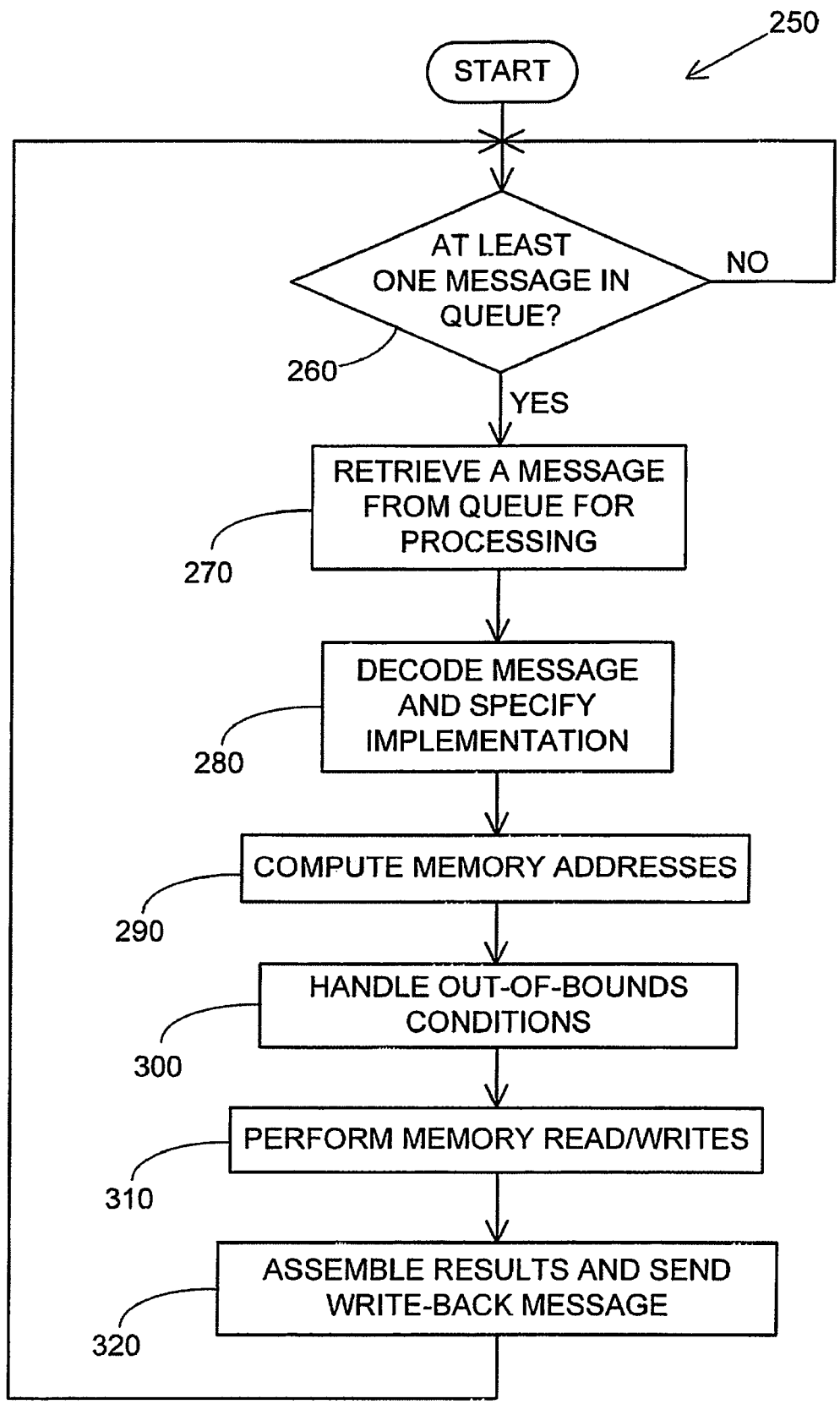

The operation of the dataport is better understood if reference is made additionally to FIGS. 4A and 4B, in which a schematic flowchart illustration describes a method of operation for a dataport, according to an embodiment of the present invention. FIGS. 4A and 4B show two parallel processes: process 200, which places arriving messages in a queue; and process 250, which retrieves messages from the queue and processes them.

A message queue 150 may buffer messages arriving on input bus 128 and may pass them on in a certain order to a message decoder 154. For example, message queue 150 may pass on received messages on a first-come, first-served basis, in which case the queue may be implemented using a first-in first-out (FIFO) register. Upon START, process 200 advances to stage 210, in which it may wait until a new message becomes pending on input bus 128, and may then advance to stage 220.

Message queue 150 may be equipped with a flow-control mechanism allowing it to temporarily suspend the arrival of further messages when the message queue becomes full, and to resume the reception of messages when one of the messages already received has been serviced In stage 220, process 200 may check whether the message queue is full, by determining whether there is sufficient room in the message queue to store the new message. If there is insufficient room, process 200 may wait until process 250 may have serviced enough messages in the message queue for space to become available for the new message. At this point, process 200 may advance to stage 230, in which it may place the new message in the queue.

After adding the new message to the queue, process 200 may then return to stage 210, in readiness for the next arriving message.

The message queue width may be identical to the input bus width, and its depth may be, for example, 16 words, allowing for temporary buffering of up to two maximum-length messages with an exemplary length of eight words each, or for storage of a larger number of shorter messages.

As stated hereinabove, implementation of the message queue is not restricted to a FIFO register. Messages might instead be serviced in an order that differs from the sequence of their arrival. For example, such an arrangement might serve a dataport that supports multiple data memory caches, and which may defer servicing of the next message in the queue when the cache containing the data referred to in the message is busy, and meanwhile service a later message requiring access to another cache that is currently available.

Upon START, process 250 may advance to stage 260, in which it may wait until process 200 has placed at least one message in message queue 150, at which time process 250 may advance to stage 270.

In stage 270, process 250 may retrieve a message from message queue 150 for processing, and may then advance to stage 280.

In stage 280, message decoder 154 may decode the retrieved message, and divide the requested operation into a number of steps that the message decoder then passes on via a bus 132 to data processor 156, for execution. Message decoder 154 may also pass on to data processor 156 requester identifier information indicating the specific processor core or core thread that sent the message, in order that data processor 156 may subsequently include this information in a target identifier included in the write-back message. The inclusion of the target identifier may provide arbiter 116 (FIG. 2) with the information necessary for routing each write-back message to the specific core or core thread that sent the original message On completion of stage 280, process 250 may advance to stage 290.

The main function of data processor 156 is to assemble and disassemble data. If a thread requests an operation involving the modification of data stored in the memory, data processor 156 may perform the necessary manipulations of data in individual memory locations. For requested operations involving the return of data to the calling thread, data processor 156 may retrieve data from individual memory locations and may assemble the data and deliver it in the data portion of write-back bus 130. Data processor 156 may also return supervisory information in the sideband portion of write-back bus 130.

Figure 5:
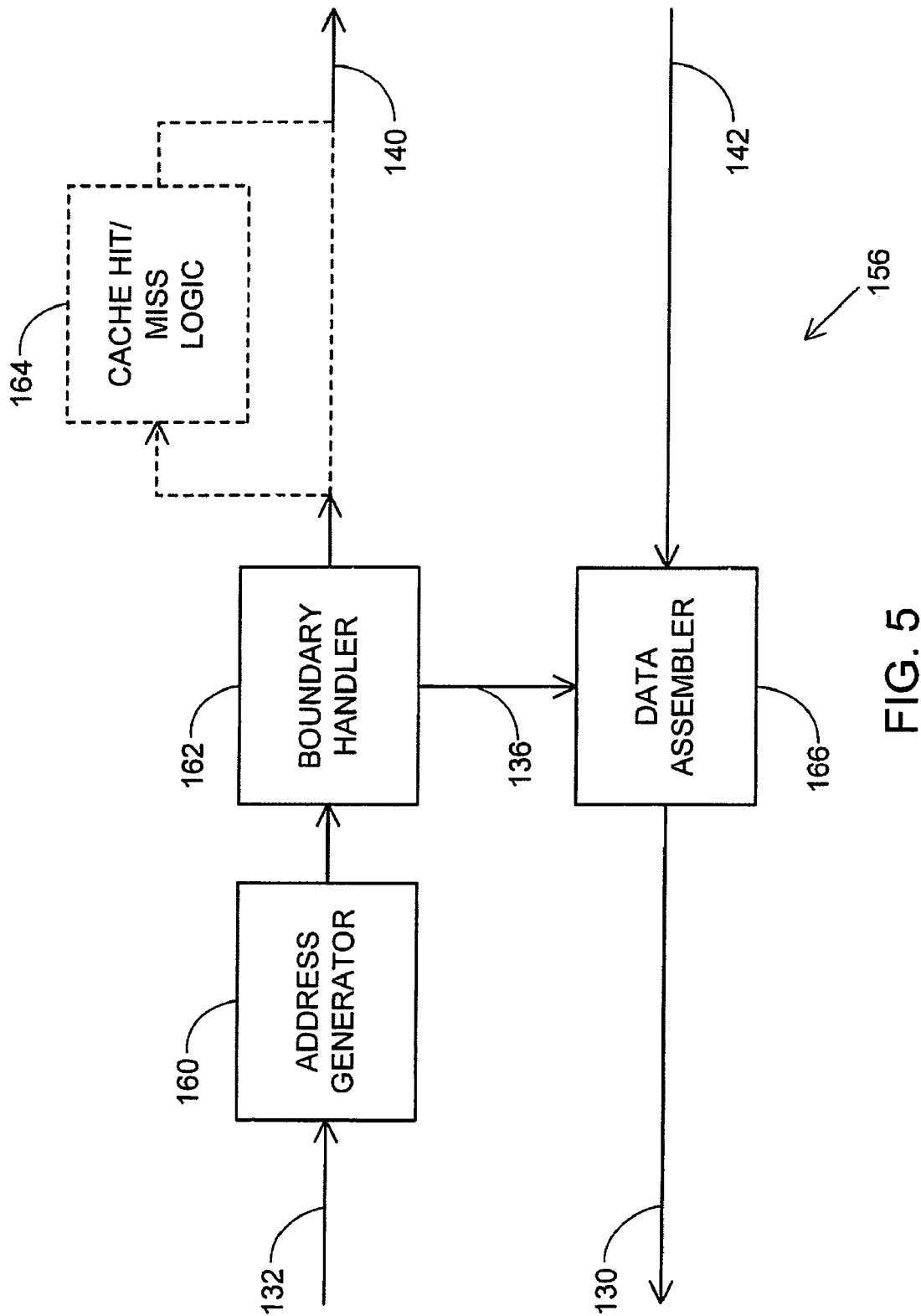
FIG. 5 is a block diagram of a dataport's data processor block, in accordance with some embodiments of the present invention.

Reference is now made to FIG. 5, in which an exemplary data processor, in accordance with an embodiment of the invention, is illustrated.

Data processor 156 may include an address generator 160, a boundary handler 162, an optional cache hit/miss logic block 164, and a data assembler 166.

In stage 290, address generator 160 may analyze the list of steps received from message decoder 154 and may compute memory addresses for writing data to, and/or reading data from, RAM 90. As an example, when the requested operation relates to a 2-dimensional image area, address generator 160 may disperse the image lines in, and/or collate the image lines from, the requested locations in memory, depending on whether the operation is a memory write and/or read operation, respectively. On completion of stage 290, process 250 may advance to stage 300.

When cores 108 are single-instruction, multiple-data (SIMD) engines, their instructions may be performed concurrently on multiple data elements, which may be, for example, bytes, 16-bit words, or 32-bit words. Each data element might require access to a different memory location, in which case address generator 160 may also be responsible, during a data write operation, for generating the correct addresses for performing the so-called data-scattering operation of distributing the data elements at their respective locations. Likewise, during a data read operation, address generator 160 may also be responsible for generating the addresses for performing the data-gathering operation of collating the data elements from their respective locations.

In stage 300, boundary handler 162 may check the steps and addresses generated by address generator 160 for errors, including, for example, out-of-bounds conditions such as a requested data block operation that if fully implemented would violate the specified bounds of a data structure. A practical example of such a data structure might be one representing a 2-dimensional image. The boundary handler may determine any necessary evasive action, which may involve adjusting the results of the address computations generated by address generator 160. Such adjustment might include, for-example, the application of any of the following three out-of-bounds addressing modes: clamp mode, in which out-of-bounds data are replicated with the values of nearest-edge data; wrap mode, in which data structure addresses wrap round the data structure; and mirror mode, in which data structure addresses alternately reflect about the edges of the data structure.

On completion of stage 300, process 250 may advance to stage 310, in which boundary handler 162 may perform the requested reading and writing operations on areas of RAM 90.

As hereinabove mentioned, message decoder 154 may pass on to data processor 156 information identifying the source of each message. This information may, in turn, be passed on within data processor 156 from address generator 160 to boundary handler 162, and thence, via a link 136, to data assembler 166. Link 136 may also convey indications generated by boundary handler 162 relating to errors that may have occurred during the execution of a requested operation, such as violation of image bounds.

For a memory write operation, data assembler 166 may perform disassembling of requested data for the memory write. The disassembling operation organizes the data elements in the request message and forms the data according to the format of transactions on write bus 140. The disassembling operation may include data alignment, format conversion and data scattering.

Data assembler 166 may receive memory address information for a given data element or a group of data elements via link 136. According to the memory address information, data assembler 166 aligns the data element or the group of data elements to format transactions on write bus 140. For example, transactions on write bus 140 may be in units of cache lines. A cache line may contain memory-aligned 16 bytes or memory-aligned 32 bytes, for example. Data assembler 166 may include assembly buffers that can be assembled for one or more cache lines. If the data element is a single byte, data assembler 166 puts the data element at the byte location within a cache-line assembly buffer, sets the write-enable bit for the corresponding byte location and clears enable bits for the rest of the byte locations within the cache line. The write-enable bit for a byte element may be referred to as a byte enable. The assembled cache line together with the byte enables may then be sent out as a transaction on write bus 140.

For a group of byte data elements that belongs to the same cache line, the memory address information may include the address of the first data element. Data assembler 166 may place the group of byte data elements sequentially in a cache-line assembly buffer starting from the address of the first data element, and may set the corresponding byte enables. Data assembler 166 may clear the rest of the byte enables within the cache line. This assembled cache line together with the byte enables may then be sent out as a transaction on write bus 140.

Alternatively, different data alignment support may be provided by data assembler 166. For example, data assembler 166 may support alignment to word (2 bytes) or alignment to doubleword (4 bytes). When applicable, these coarse-grain alignments may reduce the hardware implementation cost of the dataport. For example, fewer write-enable bits are required to be sent on write bus 140. For a cache line of 32 bytes, there are 32 write-enable bits if byte alignment is supported, but only 8 write-enable bits if doubleword alignment is supported.

A memory write request message may contain data that resides in multiple data cache lines in the memory. There may be one or more memory write transactions associated with each memory write request message. For example, a memory write request message may contain a group of data elements that are contiguous in memory but cross cache line alignment boundaries. The data alignment operations described above apply to each of the cache line memory write transactions.

Data assembler 166 may also perform format conversion to convert the data from the format in the request message to the intended format in memory. Format conversion may include numerical format conversion and the associated data packing and unpacking. Data assembler 166 may convert data from any format to any other format and may support a subset of conversion. Since the numerical data formats may have different sizes, data assembler 166 may also perform data packing and data unpacking as necessary. Data packing is the process of converting data from a large size to a small size. For example, when converting four data elements of 32-bit floating point format into four data elements of 8-bit integer format, the packing operation converts each 32-bit data element into an 8-bit integer data element. The total of 128 bits is then packed into four adjacent byte locations in data assembler buffer. Data unpacking is the process of converting data from a small size to a large size.

A non-exhaustive list of examples of numerical formats includes integer data formats, fixed point data formats and floating point data format in various sizes. For example, integer data formats may include unsigned byte integer, signed byte integer, unsigned word integer, signed word integer, unsigned doubleword integer, signed doubleword integer, and the like. Floating point data formats may include 64-bit double precision floating point, 32-bit single precision floating point, 16-bit floating point and 8-bit floating point formats. Numerical data formats may also include range-confined data formats such as signed normalized integer and unsigned normalized integer. A signed normalized integer of a certain size (number of bits) may contain data in two's complement numbers representing a floating point value in the range of −1 to 1, with the maximum integer value corresponding to 1 and the minimum integer value corresponding to −1 and any other values as fractions between −1 to 1 that are evenly spaced between −1 and 1. Similarly, an unsigned normalized integer of a certain size may represent fractional numbers evenly spaced between 0 and 1. For example, when converting an unsigned byte integer of 0xFF to a floating point format, the result is 255.0f. When converting a signed byte integer in two's complement of 0xFF to a floating point format, the result is −1.0f. When converting an unsigned normalized byte integer of 0xFF to a floating point format, the result is 1.0f.

Data assembler 166 may also perform scattering write operations. In such operations, a request message may contain multiple data elements. Each data element is provided with memory address information and size information. Using the address and size information provided over link 136, data assembler 166 disassembles the data in the request message. Data assembler 166 then performs format conversion of each data element and aligns each data element in the cache-line assembly buffer and sends the assembled cache line out on write bus 140. Data assembler 166 repeats the above operations for all data elements in the request message.

Performance optimization may also be employed in this disassembling process For example, when more than one data element belongs to the same cache line in the memory, these data elements may be placed in the same cache-line assembly buffer. Data assembler 166 sets corresponding write enables for these data elements and sends out the assembled cache line once on write bus 140. This may improve the throughput of the dataport and may also reduce the utilization of write bus 140, thus reducing the traffic on the cache and memory hierarchies.

On completion of stage 310, process 250 may advance to stage 320, in which data assembler 166 may construct write-back messages that are responses to the messages received from the threads via input bus 128, and may deliver the write-back messages to the calling threads via write-back bus 130. Data assembler 166 may serialize the transmission of the words of a multiple-word write-back message.

Data assembler 166 may place the assembled data in the data portion of write-back bus 130.

Data assembler 166 may include a variety of additional information in a write-back message, and may use the sideband portion of the write-back bus for this purpose. A first example of such additional information is the requester identity information that data assembler 166 may have received from boundary handler 162 via link 136, and which data assembler 166 may include, as a target identity, in the write-back message, in order that arbiter 116 (FIG. 2) may route the write-back message back to the originating thread. A second example of such additional information is supervisory information relating to errors that may have occurred during the execution of a requested operation, that data assembler 166 may have received from boundary handler 162. A third example is an indication that a write operation has been completed that data assembler 166 may include in a write-commit write-back message.

For a memory write operation, data assembler 166 may perform the assembly of a write-commit write-back message at stage 320, when write-commit is requested by the request message. A write-commit signal may be sent to write bus 140 after all cache line transactions are sent out on the same bus. (Alternatively, the write-commit signal may be part of the sideband signals on write bus 140 associated with the last cache line transaction.) When the dataport receives the write-commit done signal from memory hierarchy 120, a request is sent to data assembler 166 to form a write-commit write-back message. When multiple write-commit requests are allowed in flight in memory hierarchy 120, each write-commit will have identification carrying the requester's information. When a write-commit done signal is received, the dataport also receives the requester's identification information. Alternatively, a memory write message with write-commit may be supported as a non-pipelined message. In that case, upon transmitted all memory write transactions on write bus 140, the dataport may stall service of subsequent requesting messages until receiving the write-commit done signal from the memory hierarchy. The dataport may maintain the requester's identification information for the write-commit signal and may use it to assemble the write-back message.

Data assembler 166 may also be requested to assemble and/or gather data that have been read from memory. For a memory read operation, data assembler 166 performs assembling of requested data for the memory read. The assembling operation organizes the data elements in the return data read from memory and forms the data according to the requested format for the write-back messages to be sent to the calling threads via write-back bus 130. Similar to the disassembling operation for a memory write operation, the assembling operation for a memory read operation performed by data assembler 166 may include data alignment, format conversion, data gathering and the like. A non-exhaustive list of examples of data assembly includes collating the lines of a two-dimensional image area; organizing the data in a specific format, such as translating color information from vector to scalar format; aligning the data received from cache memory hierarchy 120 to 32-bit or 64-bit boundaries. The term "data gathering" used above refers to the process of gathering data elements from multiple locations in memory for concurrent transmission to a requesting thread by means of a single write-back message.

Data assembler 166 receives memory read transactions on read bus 142. A memory read transaction may contain data elements in certain alignment, for example, aligned to a cache line. For each cache line of read data, data assembler 166 may also receive control signals used to assemble the data. Such control signals may include format signals (memory data format and requesting data format), address signals (data elements memory alignment and data elements requesting alignment), and the like. The control signals may be delivered in different ways.

In one embodiment, the control signals are transmitted as part of the memory read transaction to the memory hierarchy on the write bus 140. Memory hierarchy 120 returns the control signals back to the dataport as part of the memory read transaction on read bus 142.

In another embodiment, the dataport may put the control signals for each memory read transaction sending on write bus 140 in a latency first-in-first-out (FIFO), when memory hierarchy services memory read transactions in sequential order. Upon receiving a memory read transaction on read bus 142, the dataport receives the corresponding control signals for the transaction. As all memory transactions are returned in order, the dataport may simply pick the head of the latency FIFO upon receiving a memory read transaction on read bus 142.

In yet another embodiment, the dataport may put the control signals for each memory read transaction sending on write bus 140 in a latency queue, when the memory hierarchy may service memory read transactions in out-of-order fashion. Out of order may occur if the memory hierarchy contains caches and the caches allow cache hits to pass cache misses. The dataport may assign a unique identification for each memory read transaction sent on write bus 140. The memory hierarchy may return the memory read transaction on read bus 142 carrying the request identification. Upon receiving a read transaction on read bus 142, the dataport may use the unique identification to retrieve the associated control signals from the latency queue for the transaction.

According to the addressing signals associated with memory read transactions, data assembler 166 realigns the data element or the group of data elements to format a write-back message from one or more read transactions received from read bus 142. The data realigning performed by data assembler 166 during a memory read operation is similar to the data aligning performed by data assembler 166 during a memory write operation, which has been described above. For example, data realignment may be performed in units of bytes or in units of doublewords. There may be multiple memory read transactions belonging to the same write-back message. Data assembler 166 may assemble data from multiple memory read transactions to form the data package for a write-back message.

The format conversion performed by data assembler 166 during a memory read operation is similar to the format conversion performed by data assembler 166 during a memory write operation, which has been described above.

The data gathering operation performed by data assembler 166 during a memory read operation is similar to the data scattering performed by data assembler 166 during a memory write operation, which has been described above.

Optional cache hit/miss logic block 164 may manage access to a cache memory, including detecting whether or not the required contents of a memory location currently reside in cache memory hierarchy 120 (FIG. 2). In the event of a cache hit, cache hit/miss logic block 164 may transfer the requested data to data assembler 166. When a cache miss occurs, cache hit/miss logic block 164 may reserve a cache line in cache memory hierarchy 120, and request memory subsystem 122 (FIG. 2) to transfer the corresponding data from RAM 90. The requested data may then be transferred to the reserved cache line location in cache memory hierarchy 120, and may also be transferred to data assembler 166. If the optional cache hit/miss logic block is excluded from dataport 112, it may be implemented elsewhere in the system.

Data assembler 166 may place the assembled data in the data portion of write-back bus 130.

On completion of stage 320, process 250 may return to stage 260 in readiness for processing another message.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A system comprising:
a first processor;
a second processor;
a dataport, said processors coupled in parallel to the dataport; and
a shared memory shared by said processors, said dataport coupled to said shared memory, said dataport to perform memory access operations on said shared memory for each of said processors, each processor to send a message to the dataport and to specify a location where a response from said dataport is to be stored and to enable the thread to lock said location when the thread sends the message to the dataport, wherein said dataport further comprises:
an input bus to receive a message from at least one of said processors for executing one or more threads requesting an operation on said shared memory; a message decoder to determine solely from said message which steps are to be performed in order to execute said operation and to identify requester of said operation; and a data processor to perform said steps.

2. The system of claim 1, wherein said operation includes writing data from said message into said shared memory.

3. The system of claim 1, further comprising a write-back bus to transmit a write-back message, wherein said data processor generates said write-back message.

4. The system of claim 1, wherein said data processor performs data-scattering, data-gathering and format conversion operations.

5. A method comprising:
coupling each of two processors in parallel to a dataport, in turn coupled to a memory shared by said processors;
enabling said dataport to execute shared memory access operations for each of said processors;
enabling a thread to send a message to the dataport and to specify a location where a response from said dataport is to be stored;
enabling the thread to lock said location when the thread sends the message to the dataport; and
receiving a message in said dataport from two or more threads running on said processors requesting an operation on the shared memory and decoding said message to determine, solely from said message, which steps are to be performed in order to execute said operation and to identify a requester of said operation, and performing said steps by a data processor.

6. The method of claim 5, wherein said operation includes writing data from said message into said shared memory.

7. The method of claim 5, further comprising the step of transmitting a write-back message.

8. The method of claim 7, wherein said operation includes reading data from said shared memory and inserting said data into said write-back message.

9. The method of claim 7, wherein said write-back message contains a target identifier.

10. The method of claim 5, further comprising the steps of: organizing a queue of messages; and suspending arrival of said message when said queue is full.

11. The method of claim 5, wherein said operation refers to a data structure and said message includes attributes of said data structure.

12. The method of claim 5, further comprising the steps of: processing said steps to be performed; computing addresses for accessing said shared memory; checking said steps and said addresses for errors; and accessing said shared memory using any one of a set of out-of-bounds addressing modes.

13. The method of claim 5, further comprising performing data- scattering and data-gathering operations.

* * * * *